United States Patent [19]

Kuschel et al.

[11] Patent Number: 4,457,108
[45] Date of Patent: Jul. 3, 1984

[54] DOOR

[75] Inventors: Konrad Kuschel, Vienna; Alfred Wiehl, Klosterneuburg, both of Austria

[73] Assignee: IFE Gesellschaft m.b.H., Vienna, Austria

[21] Appl. No.: 271,182

[22] Filed: Jun. 8, 1981

Related U.S. Application Data

[63] Continuation of Ser. No. 42,056, May 24, 1979, abandoned.

[30] Foreign Application Priority Data

May 29, 1978 [AT] Austria .................................. 3878/78

[51] Int. Cl.³ ....................... E05D 15/10; E05F 17/00
[52] U.S. Cl. ........................................ 49/213; 49/118; 49/217; 49/222; 49/225
[58] Field of Search ................. 49/211, 212, 213, 216, 49/217, 221, 222, 225, 223, 209, 116, 118

[56] References Cited

U.S. PATENT DOCUMENTS

| | | | |
|---|---|---|---|
| 1,893,377 | 1/1933 | Rose | 49/118 X |
| 2,570,563 | 10/1951 | Kreimendahl | 49/217 |
| 2,653,022 | 9/1953 | Armstrong | 49/118 X |
| 2,774,998 | 12/1956 | Kierkert | 49/217 |
| 4,050,191 | 9/1977 | Azuma | 49/118 X |
| 4,091,570 | 5/1978 | Favrel | 49/118 |
| 4,152,870 | 5/1979 | Knap | 49/118 |

FOREIGN PATENT DOCUMENTS

| | | | |
|---|---|---|---|
| 1268015 | 5/1968 | Fed. Rep. of Germany | 49/222 |
| 1708257 | 2/1973 | Fed. Rep. of Germany | 49/212 |

*Primary Examiner*—Philip C. Kannan
*Attorney, Agent, or Firm*—Michael J. Striker

[57] ABSTRACT

A door includes an elongated bearing rail and at least one door section which is operatively connected to the rail for sliding movement in a direction along the elongation of the rail. The door section is so mounted relative to the rail as to perform transversal movement about an axis extending substantially in parallel to said rail. During the transversal movement of the door section frictional rotation between the bearing rail and the connecting means is precluded.

23 Claims, 6 Drawing Figures

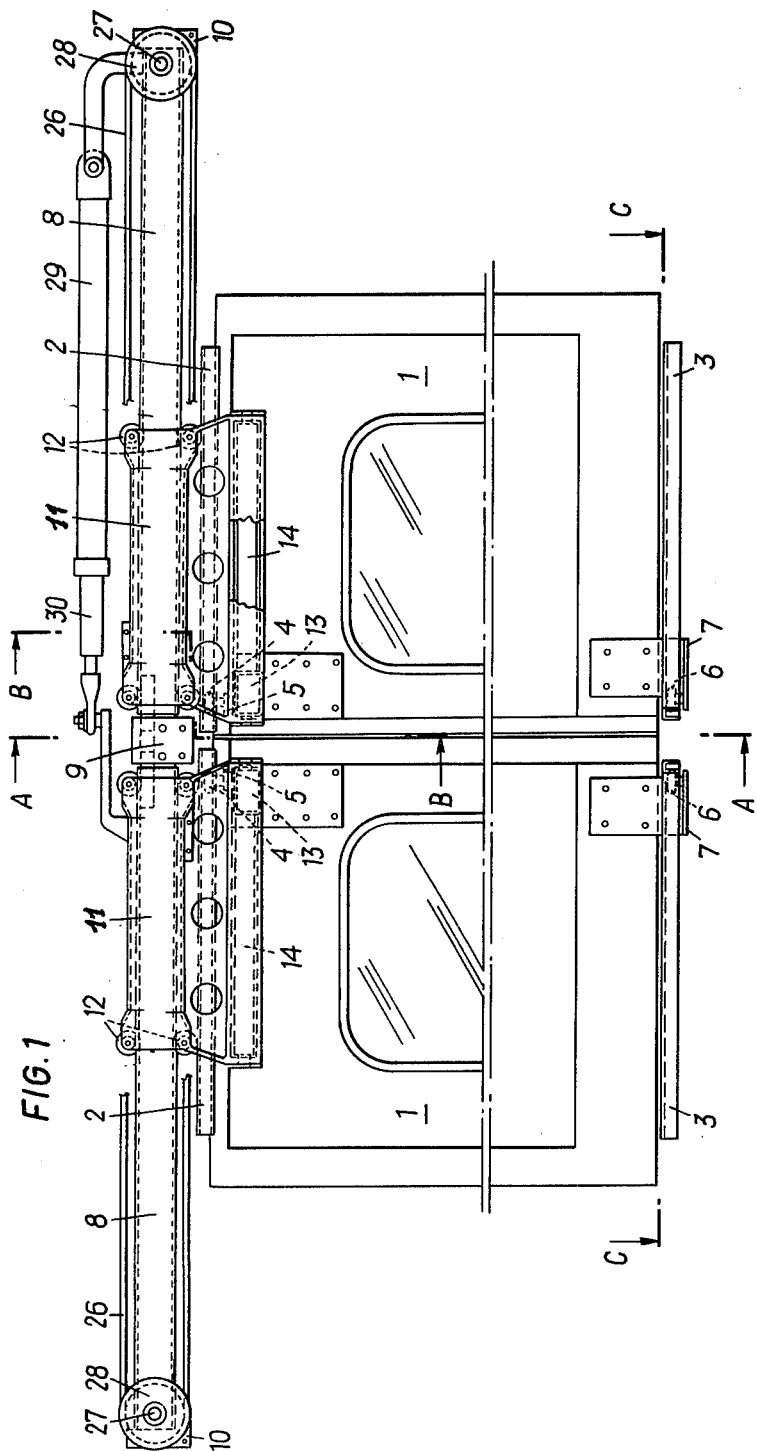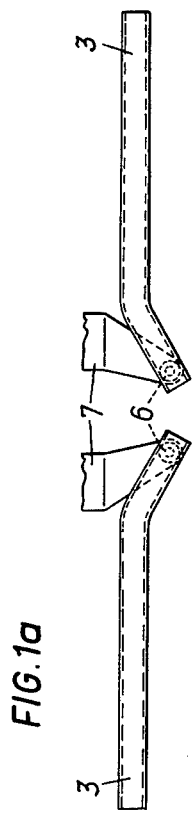

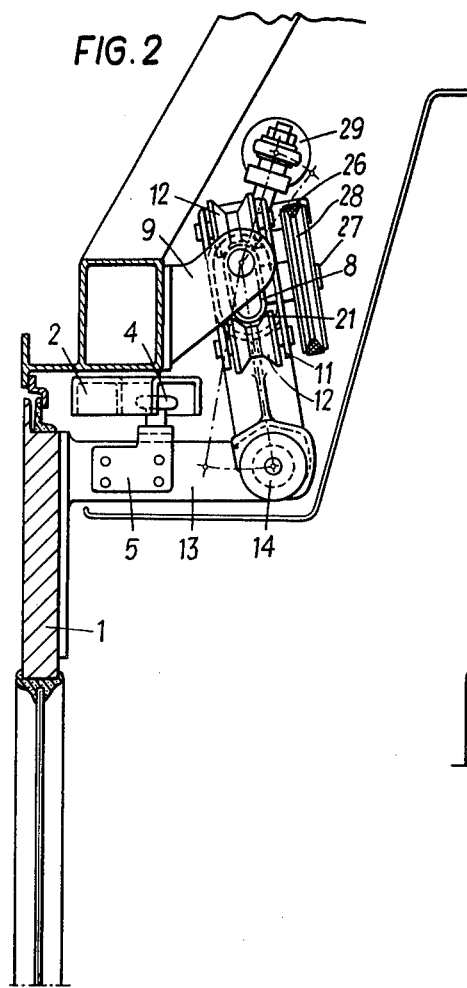
FIG. 2
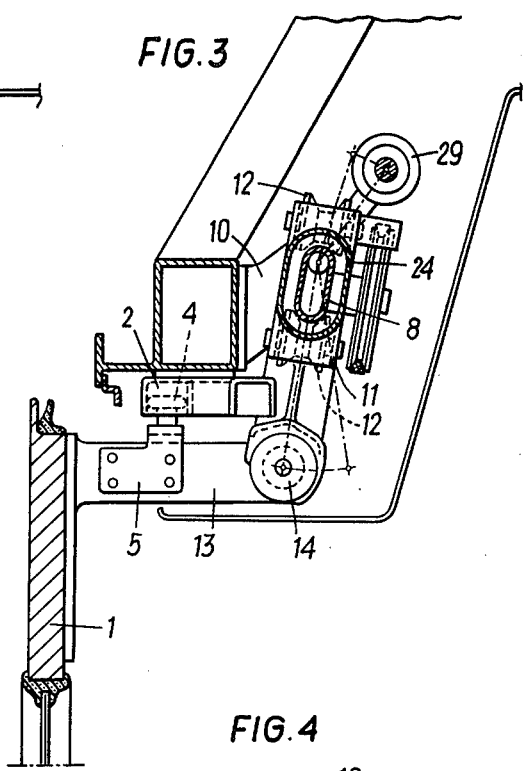
FIG. 3
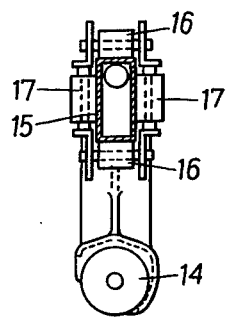
FIG. 4
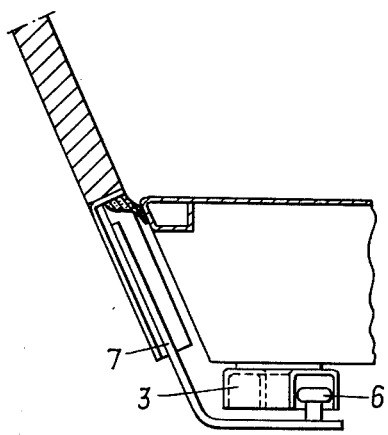
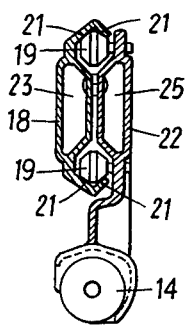
FIG. 5

DOOR

CROSS REFERENCE TO A RELATED APPLICATION

This application is a continuation of the application Ser. No. 42,056 filed May 24, 1979 and now abandoned.

BACKGROUND OF THE INVENTION

The present invention relates to doors.

More particularly, the present invention is concerned with doors for vehicles.

It is known in the prior art to provide a vehicle with a door having at least one door section which is slidable along an outer side wall of the vehicle between a closed position and an open position. When the door section is in the closed position, it swings into the outer side wall. It is also known to provide a bearing rail which extends horizontally and parallel relative to the side wall. The door section slides along such a bearing rail between the open and closed positions. The door section is supported (i.e. suspended) on the bearing rail by means of an attachment plate which is provided with guide rollers which are positively locked (i.e. engaged) with the bearing rail. The door section is able to swing in a direction which is transverse to a direction of the sliding movement of the door section along the bearing rail.

In German Patent No. 1 081 324 it has been suggested, for example, to suspend a door section on an attachment plate which is provided with two double conical guiding roller units. The roller units are located on the attachment plate as to surround a tubular supporting rail at the opposite sides thereof. The supporting rail has a circular cross-section. The rail extends horizontally and parallel relative to and is fixedly connected to a side wall of a vehicle. Thus, the rail functions as a guide element for the door section to be kept in parallel to itself, and such a suspension arrangement of the door section takes up all possible vertical stresses (i.e. loads) stipulated by the weight of the door section itself in particular and all the supporting elements in general.

The drawback of such a door becomes especially apparent when it is necessary to displace the latter in the open position by way of transversally moving the door section outward. During such a movement of the door section, the double conical rollers frictionally rotate about the rigid stationary supporting rail. Obviously, it is necessary to increase the pulling force correspondingly so as to overcome a counterforce in the frictional engagement between the rollers and the supporting rail. Moreover, the friction between the rollers and the rail during the movement of the door section absolutely improductively leads to an additional wear (i.e. abrasion) of the rollers and the rail. This fact is most likely to result in reducing the service life of the rollers and the rail in particular and the door in general. It goes without saying that the same negative results occur during the movement of the door section from the open into the closed position.

In Austrian Patent No. 242 738 it has been suggested to provide a door having an outward movable door wing which is operatively connected to a supporting rail so that the latter may displace together with the door wing and relative to a side wall of a vehicle. The supporting rail is provided at the respective ends thereof with supports for pivoting relative thereto. During pivoting movement of the rail between the open and closed positions of the door, the rollers disadvantageously frictionally rotate along the outer surface of the supporting rail.

SUMMARY OF THE INVENTION

It is a general object of the prsent invention to avoid the disadvantages of the prior art doors.

More particularly, it is an object of the present invention to provide such a door which requires a comparatively smaller pulling force to open the door.

Another object of the present invention is to increase a service life of the door in general and rollers and rail in particular.

Still another object of the present invention is to reduce wear (i.e. abrasion) of the rail and rollers during transversal movement of the door between an open position and a closed position.

In pursuance of these objects and others, which will become apparent hereafter, one feature of the present invention resides in a door comprising an elongated bearing rail, at least one door section operatively connected to said rail for sliding movement in a direction along the elongation of said rail and means mounting said door section to perform transversal movement about an axis extending substantially in parallel to said rail. Due to the pivoting movement of said rail during the transversal movement of the door section frictional rotation between bearing rail and connecting means is precluded.

In accordance with another feature of the invention the rail has a cross-section any other than circular that is torsion proof thus preventing twisting of the rail which may otherwise occur due to vertical load on the door section. Such a cross-section of the rail makes it possible to manufacture the mounting means comparatively lighter and less space consuming.

Thus, when the door section moves between the open and closed positions guide rollers do not frictionally rotate relative to the rail. Therefore, any wear of the rail and the rollers during the movement of the door section is precluded. Obviously, this fact considerably increases the service life of the rail and rollers in particular and the door in general.

In yet another feature of the present invention, the bearing rail has an oval cross-section, preferably, with straight longitudinal sides.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is an inside front view of a door in accordance with the present invention;

FIG. 1a is a sectional view taken along the line C—C in FIG. 1;

FIG. 2 is a sectional view taken along the line A—A in FIG. 1 when the door is closed;

FIG. 3 is a sectional view taken along the line B—B in FIG. 1 when the door is open;

FIG. 4 is a sectional view of another embodiment of a portion of the door shown in FIG. 1; and FIG. 5 is a sectional view of still another embodiment of the portion of the door shown in FIG. 1.

DESCRIPTION OF THE PREFERRED EMBODIMENTS

Referring now to the drawings and first to the FIG. 1 thereof, it may be seen that the reference numeral 1 designates door sections of a two-leaved door. The two-leaved door further includes an upper guiding rail 2 and a lower guiding rail 3. Each door section 1 is provided respectively with an upper roller 4 installed on the door section via a support member 5 and a lower roller 6 which is connected to the door section 1 via a cantilever 7 (see FIG. 1a).

The door (i.e. two door sections 1) is supported by a suspension arrangement which includes a bearing rail 8 having, for example, an O-shaped cross-section. The bearing rail 8 is supported at its intermediate portion by a bearing 9 and at its outer ends by outer bearings 10.

The door sections 1 may slide towards and away from each other and along the guiding rails 2.

Owing to the swinging ability of the bearing rail 8, transversal as well as longitudinal movements of the door sections 1 are made possible.

The guiding rollers 12 may constitute two double-conical-roller units which are clearance-free assembled on the attachment plate 11. Each door-section 1 is hinged to the bearing rail 8 via attachment plate 11, bearing member 13, and bearing pin 14 extending in parallel to said rail.

The guiding rollers 12 may have any other shape different from that discussed hereabove in connection to the embodiment shown in FIG. 2. It is especially true when the bearing rail 8 has a cross-section different from the O-shaped one. Thus, the rail 8 may have a rectangular cross-section (see FIG. 4). In this case, the rectangular rail 15 is surrounded by cylindrical rollers 16 and 17. The rollers 16 and 17 engage the respective surface of the rail 15 along a line, rather than a point as in the case of the conical rollers (see the embodiment shown in FIGS. 2 and 3). This embodiment (see FIG. 4) is especially advantageous when the door-sections are extremely heavy. Such an embodiment renders it possible to substantially reduce wear (i.e. abrasion) of the rollers and the rail.

FIG. 5 shows a bearing rail 18 which is substantially different from the rail 15 shown in FIG. 4 and the rail 8 shown in FIGS. 2 and 3. As opposed to the circumferentially closed rails shown in FIGS. 2, 3 and 4, the rail 18 shown in FIG. 5 is open so as to define recesses corresponding to and adapted for receiving double conical rollers 19 respectively.

Such a configuration of the rail 18 renders it possible to advantageously reduce the space required for the rail. In other words the entire vertical length of the rail 18 is used up.

The reference numeral 21 is used to designate formations on the rail 18 for receiving the rollers 19 mounted on an attachment plate 22. Since the open configuration of the rail 18 does not provide in most cases an adequate resistance to twisting stresses, it may be advisable to provide the rail 18 with an additional twist-resistant element shaped as a hollow body 23.

In this context it must be mentioned that the attachment plate 11 shown in FIGS. 2 and 3 is also shaped as a hollow body 24 which circumferentially surrounds the bearing rail 8.

Coming back to the embodiment shown in FIG. 5, the attachment plate 22 is provided with a twist-resistant hollow formation (body) 25.

The two-leaved door shown in FIG. 1 is provided with a synchronizing arrangement which is known per se in the art. Such a synchronizing arrangement may include an endless belt drive 26 or a cable rope drive or a chain drive, etc. The synchronizing arrangement may further include return pulleys 28 connected to the bearing rail 8 by means of supporting pins 27 so that an upper strand (or stringer) is connected by clamping devices (not shown) with one of the attachment plates 11, whereas a lower strand (or stringer) is connected to the other of the two attachment plates 11.

Thus, when the door sections 1 and, therewith the attachment plates 11 move between a closed position (see FIG. 2) and an open position (see FIG. 3) the position of the synchronizing means relative to the attachment plates 11 is kept unchanged.

Thus, the synchronizing arrangement accomplishes in a simple manner the synchronizing of the longitudinal movement of the attachment plates 11 and thereby of the door sections 1.

A hydraulic or pneumatic cylinder-piston unit may be provided for moving the door section (or sections) between the closed and open positions.

According to the art either hydraulic or pneumatic cylinder-piston units are used to move doors. For this purpose the piston rod is fixed to the door wing and the cylinder to door frame. According to the present invention, the piston rod 30 is connected to one of the attachment plates 11 and the cylinder 29 is fixed by a support connected to one of the bearing rails. Thus, the cylinder-piston unit swings with the attachment plates 11 exerting a pulling force in parallel to the bearing rails 8.

It is to be understood that the door in accordance with the present invention may have only one door section 1.

It will be understood that each of the elements described above, or two or more together, may also find a useful application in other types of a door differing from the types described above.

While the invention has been illustrated and described as embodied in a door it is not intended to be limited to the details shown, various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A slidable door, particularly for use in vehicles having a side wall, comprising at least one door section adapted to be flush with the vehicle side wall when the door section is in its closed position; a bearing rail supported in the vehicle, said door section being arranged to slide along said bearing rail in a direction parallel to the vehicle side wall; an attachment plate connected to said door section; a plurality of pairs of guide rollers engaging said bearing rail and connected to the attachment plate and operative for permitting a longitudinal sliding of the attachment plate along the bearing rail, but preventing a relative rotating movement between the attachment plate and the bearing rail; said pairs of guide rollers being spaced from one another and having respective axles rigidly connected to said attachment plate in order to provide the slidable movement of said plate along said bearing rail; said door section comprising a pin rigidly connected thereto and extending parallel to said bearing rail and hingedly connected to the attachment plate, said bearing rail having a cross-section deviating from a circular shape; and guide means comprising slide rollers connected rigidly to said door section and guide rails engaged with said slide rollers and supported in the vehicle, said guide rails having angled sections, said slide rollers being adapted to move along said guide rails, said bearing rail being adapted to pivot so as to permit said door section to move in a direction perpendicular to the vehicle side wall when said slide rollers move along the angled sections of said guide rails.

2. A door as defined in claim 1, wherein said bearing rail has a rectangular cross-section.

3. A door as defined in claim 1, wherein said bearing rail has an oval cross-section.

4. A door as defined in claim 1, wherein said bearing rail has straight longitudinal sides.

5. A door as defined in claim 1, wherein said bearing rail has at least one side open outwardly.

6. A door as defined in claim 1, wherein at least some of said rollers are cylindrical.

7. A door as defined in claim 1, wherein said bearing rail has formations so shaped as to define recesses corresponding to and adapted for guiding said guide rollers.

8. A door as defined in claim 1, wherein said guide rollers constitute double conical rollers.

9. A door as defined in claim 1, wherein said attachment plate forms a hollow body provided to resist the twisting exerted thereon during the movement of said door section.

10. A door as defined in claim 1, wherein said hollow body surrounds said rail.

11. A door as defined in claim 1, and further comprising means for increasing the resistance of the bearing rail to twisting.

12. A door as defined in claim 11, wherein said resistance increasing means include a formation provided on said bearing rail and having a predetermined shape.

13. A door as defined in claim 12, wherein said formation has a rectangular cross-section.

14. A door as defined in claim 12, wherein said formation is circumferentially complete.

15. A door as defined in claim 1, and further comprising means for movement of said door sections and including a cylinder-piston unit.

16. A door as defined in claim 15, wherein said cylinder-piston unit is operated pneumatically.

17. A door as defined in claim 15, wherein said cylinder-piston unit includes a cylinder mounted on said rail and a piston rod connecting to said attachment plate.

18. A door as defined in claim 1, and further comprising one additional door and corresponding attachment plate section and a synchronizing arrangement operative for synchronizing movement of said door sections relative to each other.

19. A door as defined in claim 18, wherein said synchronizing arrangement includes an endless drive operatively connecting said one and additional door sections to each other for synchronizing the movement of the same.

20. A door as defined in claim 19, wherein said endless drive includes at least two return pulleys mounted on said rails and an endless element rotatable about said return pulleys.

21. A door as defined in claim 20, wherein said endless element is a belt.

22. A door as defined in claim 20, wherein said endless element is a cable rope.

23. A door as defined in claim 20, wherein said endless element is a chain.

* * * * *